United States Patent
Holsman

(10) Patent No.: US 11,042,400 B1
(45) Date of Patent: Jun. 22, 2021

(54) LANGUAGE AGNOSTIC SMART CONTRACT EXECUTION ON A BLOCKCHAIN

(71) Applicant: block.one, Grand Cayman (KY)

(72) Inventor: Ian Holsman, Minneapolis, MN (US)

(73) Assignee: block.one, Grand Cayman (KY)

( * ) Notice: Subject to any disclaimer, the term of this patent is extended or adjusted under 35 U.S.C. 154(b) by 0 days.

(21) Appl. No.: 17/177,110

(22) Filed: Feb. 16, 2021

(51) Int. Cl.
*H04L 29/06* (2006.01)
*G06F 9/455* (2018.01)
*G06F 8/33* (2018.01)
*G06F 21/53* (2013.01)
*H04L 9/06* (2006.01)

(52) U.S. Cl.
CPC .......... *G06F 9/45558* (2013.01); *G06F 8/33* (2013.01); *G06F 21/53* (2013.01); *H04L 9/0643* (2013.01); *G06F 2009/45562* (2013.01); *G06F 2009/45587* (2013.01); *G06F 2221/2141* (2013.01); *G06F 2221/2149* (2013.01); *H04L 2209/38* (2013.01)

(58) Field of Classification Search
CPC ......... H04L 63/10; H04L 63/20; H04L 9/321; H04L 9/0643; G06F 21/53; G06F 21/54
USPC .......................................................... 726/27
See application file for complete search history.

(56) References Cited

U.S. PATENT DOCUMENTS

2019/0236559 A1* 8/2019 Padmanabhan ......... G06F 21/64

OTHER PUBLICATIONS

Trugman, Daniel, "ELF Loaders, Libraries and Executables on Linux," Medium. Jun. 20, 2019. Retrieved on Jan. 13, 2021 from https://medium.com/@dtrugman/elf-loaders-libraries-and-executables-on-linux-e5cfce318f94,14 pgs.

* cited by examiner

*Primary Examiner* — Longbit Chai
(74) *Attorney, Agent, or Firm* — McDermott Will & Emery LLP

(57) ABSTRACT

A method for providing a language agnostic contract execution on a blockchain is provided. The method includes providing a menu comprising multiple execution environments, and selecting, from a suite of virtual machine containers, a virtual machine container that runs an execution environment selected by the developer of the blockchain application. The method also includes enabling one or more functions in the virtual machine container to access a dedicated memory or a state variable in the block producer to run an action in the virtual machine container, the action provided by a server running the blockchain application, providing the action to the blockchain application in the virtual machine container, and writing an output from the action of the blockchain application to a secure ledger in a blockchain. A system and a non-transitory, computer-readable medium storing instructions to perform the above method are also provided.

17 Claims, 5 Drawing Sheets

US 11,042,400 B1

LANGUAGE AGNOSTIC SMART CONTRACT EXECUTION ON A BLOCKCHAIN

BACKGROUND

Field

The present disclosure generally relates to a blockchain network that provides blockchain applications in a host selected according to a language of preference by the user. More specifically, the present disclosure relates to a blockchain network having the ability to provide a virtual machine container configured to run a script in a language selected by the user.

Description of the Related Art

Blockchain networks are widely used for ensuring secured and reliable data transactions. However, typical smart contract writers use a dedicated code language that is then translated into web assembly language for execution of the blockchain application. When a given block producer operates in a code language that is not known to a developer, currently there is no option for the developer to translate the code from a familiar language to that used by the block producer. Effectively, this severely limits the number of users in a blockchain network to only those who happen to be versed in the language of choice by the block producer.

SUMMARY

In one embodiment of the present disclosure, a computer-implemented method is described for providing a language agnostic smart contract execution in a blockchain. The computer-implemented method includes providing, to a developer of a blockchain application accessed by a block producer, a menu including multiple execution environments, selecting, from a suite of virtual machine containers, a virtual machine container that runs an execution environment selected by the developer of the blockchain application from the menu, and enabling one or more functions in the virtual machine container to access a dedicated memory or a state variable in the block producer to run an action in the virtual machine container, the action provided by a server running the blockchain application. The computer-implemented method also includes providing the action to the blockchain application in the virtual machine container, and writing an output from the action of the blockchain application to a secure ledger in a blockchain.

According to one embodiment, a system is described that includes one or more processors and a memory coupled with the one or more processors, the memory including instructions that, when executed by the one or more processors, cause the one or more processors to provide, to a developer of a blockchain application accessed by a block producer, a menu including multiple execution environments. The one or more processors also execute instructions to select, from a suite of virtual machine containers, a virtual machine container that runs an execution environment selected by the developer of the blockchain application from the menu, and to enable one or more functions in the virtual machine container to access a dedicated memory or a state variable in the block producer to run an action in the virtual machine container, the action provided by a server running the blockchain application. The one or more processors also execute instructions to provide the action to the blockchain application in the virtual machine container, and to write an output from the action of the blockchain application to a secure ledger in a blockchain, wherein providing a menu including multiple execution environments includes providing a menu including at least one of JVM, native, and C++ execution environments.

According to one embodiment, a non-transitory, machine-readable medium is described that includes instructions, which when executed by one or more processors, cause a computer to perform a method that includes providing, to a developer of a blockchain application accessed by a block producer, a menu including multiple execution environments, and selecting, from a suite of virtual machine containers, a virtual machine container that runs an execution environment selected by the developer of the blockchain application from the menu. The method also includes enabling one or more functions in the virtual machine container to access a dedicated memory or a state variable in the block producer to run an action in the virtual machine container, the action provided by a server running the blockchain application, providing the action to the blockchain application in the virtual machine container, and writing an output from the action of the blockchain application to a secure ledger in a blockchain. Providing a menu including multiple execution environments includes providing a menu including at least one of JVM, native, and C++ execution environments, and providing a menu having multiple execution environments includes providing a menu including one or more versions of a same execution environment.

In yet another embodiment, a system includes a first means for storing instructions and a second means for executing the instructions to cause the system to perform a method, the method including providing, to a developer of a blockchain application accessed by a block producer, a menu including multiple execution environments, selecting, from a suite of virtual machine containers, a virtual machine container that runs an execution environment selected by the developer of the blockchain application from the menu, and enabling one or more functions in the virtual machine container to access a dedicated memory or a state variable in the block producer to run an action in the virtual machine container, the action provided by a server running the blockchain application. The method also includes providing the action to the blockchain application in the virtual machine container, and writing an output from the action of the blockchain application to a secure ledger in a blockchain.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
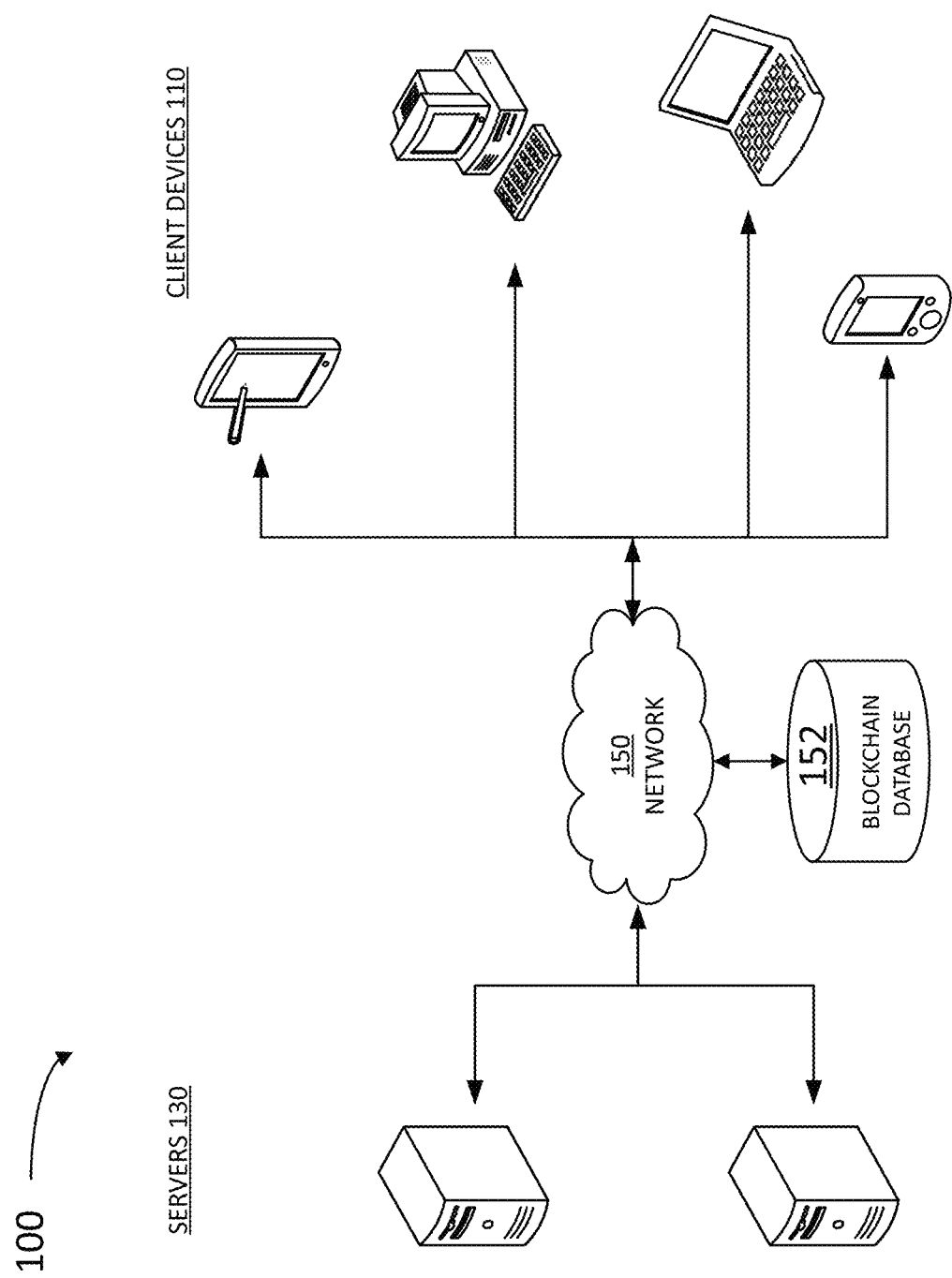
FIG. 1 illustrates an example architecture suitable for fast access to a data resource update in a blockchain network, according to some embodiments.

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

Blockchain networks are becoming more popular in the world of computer networking systems due to the simplicity and visibility of blockchain ledgers and the data security provided by the encryption scheme. In some instances, developers that create and provide a blockchain application to be used by a server that is part of a blockchain network may encounter the problem of language incompatibility between their own application tools and those of the server that will be hosting the application. Typically, developers have to rely on their knowledge of multiple languages that many servers use to run the code provided by the developers. Moreover, in some situations a developer may need knowledge of the web assembly language running on most virtual machines that host application programming interfaces (APIs). Some of the languages that developers and VMs may use include JVM (Javascript VM and the like), native, C++, and the like, including one or more different versions and updates thereof. Moreover, some of the languages and execution environments may include any one of the following: Python, PERL GO, Dart VM, EVM (Ethereum Virtual Machine), Linux, and the like.

However, as blockchain networks continue to expand their application scope and breadth, the universe of developers entering the market will grow concomitantly, and it is not a given that the language used by developers will be the same as that used in the virtual machines of the servers hosting the applications. Currently, there is no palliative solution to the above problem, other than simply having to manually rewrite code from the developer into the appropriate language in the server. This is a hindrance that, among other problems, acts as an entry barrier for new developers and new applications into the world of blockchain networks.

The disclosed system addresses this problem specifically arising in the realm of computer technology by providing a solution also rooted in computer technology, namely, offering to the developer a menu of language options to select from, and accessing a specific VM container that runs on the selected language option. Accordingly, embodiments as disclosed herein provide application developers a platform that is language agnostic and accommodates to their needs and expertise.

The subject system provides several advantages, including optimizing the time and effort employed by a developer to create and update an application for a blockchain network. This results in a better usage of server time and VM time, and enables a service provider to use multiple developers working on different VM containers (configured on different languages) at the same time, thus freeing up server time and bandwidth, and reducing time-to-completion of projects in the blockchain network.

Example System Architecture

FIG. 1 illustrates an example architecture 100 for a blockchain network suitable for practicing some implementations of the disclosure. Architecture 100 includes servers 130 and client devices 110 coupled over a network 150. One of the many servers 130 is configured to host a memory, including instructions which, when executed by a processor, cause the server 130 to perform at least some of the steps in methods as disclosed herein. In some embodiments, architecture 100 is configured to store data in a blockchain database 152. Blockchain database 152 may be accessed by block producers in servers 130, and other authorized clients of the blockchain network, who may be users of client devices 110. Servers 130 may also include service providers that collect data from multiple sources to create an immutable register (e.g., a smart contract) in blockchain database 152. Accordingly, service providers may host blockchain applications running in virtual machine containers within a block producer. In addition, servers 130 may include information providers that collect time-sensitive information for the blockchain applications. In some embodiments, the information provider may be a reliable data source that uses a verifiable signature across the blockchain network. The verifiable signature guarantees the identity of the data source and the trustworthiness of the data provided.

Servers 130 may include any device having an appropriate processor, memory, and communications capability for hosting and accessing blockchain database 152, and a virtual machine container to run a blockchain application. The blockchain application may be accessible by various clients 110 over network 150. In some embodiments, servers 130 may include a signature verification tool configured to handle public and private keys to access blockchain database 152. Client devices 110 may include, for example, desktop computers, mobile computers, tablet computers (e.g., including e-book readers), mobile devices (e.g., a smartphone or PDA), or any other devices having appropriate processor, memory, and communications capabilities for accessing the blockchain tool in one or more of servers 130, and blockchain database 152. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
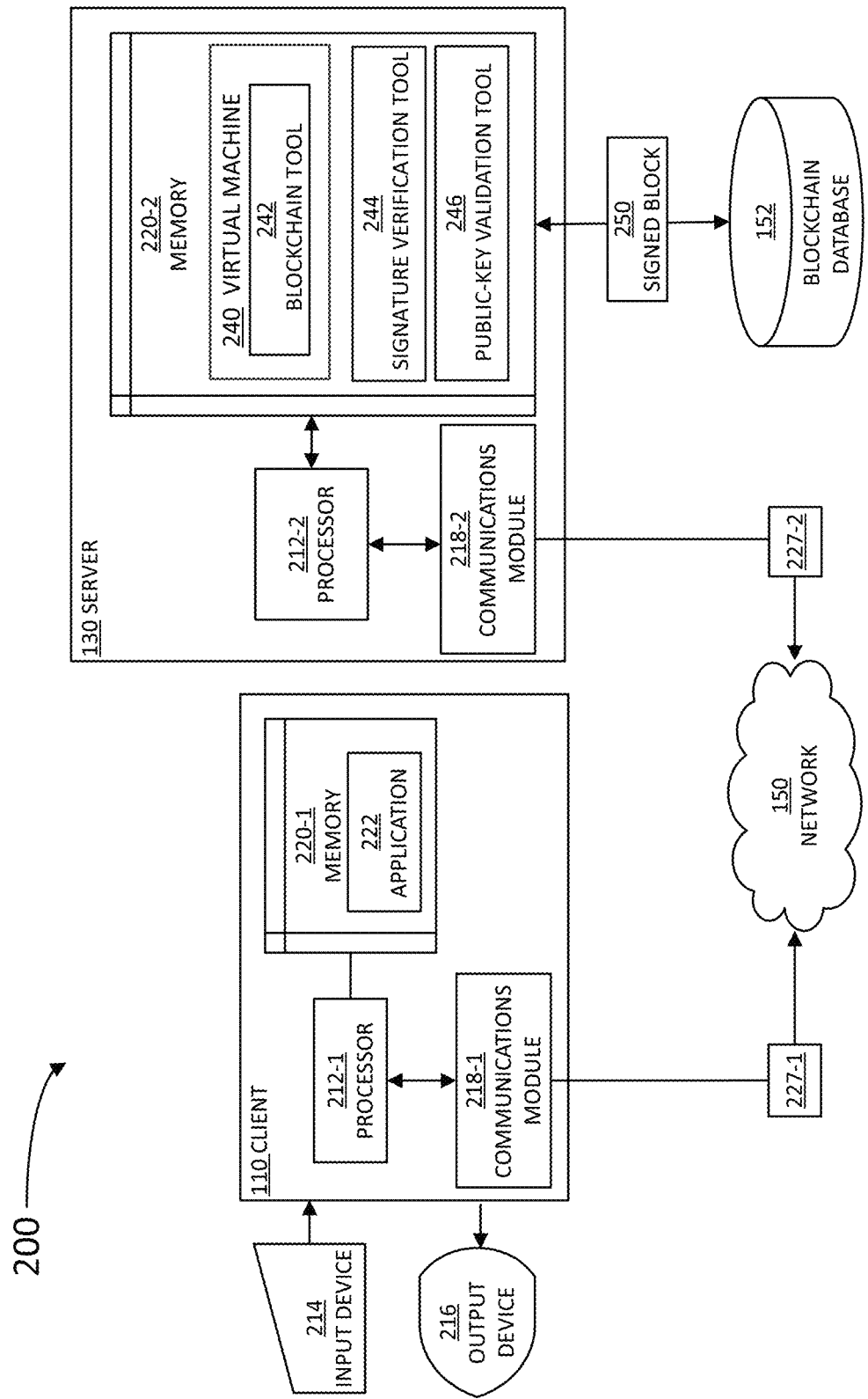
FIG. 2 is a block diagram illustrating an example server and client from the architecture of FIG. 1, according to certain aspects of the disclosure.

FIG. 2 is a block diagram 200 illustrating an example server 130, client device 110, and blockchain database 152 in the architecture 100 of FIG. 1, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems, Ethernet cards, or any port that receives information from an external device. Communications modules 218 may include hardware and software to handle data encryption, and direct access to a virtual machine container (e.g., an 'action' port for a blockchain application), or direct access to a low latency memory circuit, such as a RAM circuit.

Client device 110 may be coupled with an input device 214 and with an output device 216. Input device 214 may include a keyboard, a mouse, a pointer, or even a touchscreen display that a consumer may use to interact with client device 110. Likewise, output device 216 may include a display and a speaker with which the consumer may retrieve results from client device 110. Client device 110 may also include a processor 212-1, configured to execute instructions stored in a memory 220-1, and to cause client device 110 to perform at least some of the steps in methods consistent with the present disclosure. Memory 220-1 may further include an application 222, including specific instructions which, when executed by processor 212-1, cause a blockchain tool 242 from server 130 to display information in output device 216. In that regard, application 222 may include a smart contract application, or any other blockchain application as disclosed herein. Client device 110 may provide a data packet 227-1 to server 130, via network 150. Likewise, server 130 may provide a data packet 227-2 to client device 110. Hereinafter, data packets 227-1 and 227-2 will be referred to, collectively, as "data packets 227."

Server 130 includes a memory 220-2, a processor 212-2, and communications module 218-2. Processor 212-2 is configured to execute instructions, such as instructions physically coded into processor 212-2, instructions received from software in memory 220-2, or a combination of both. Memory 220-2 includes a virtual machine 240 wherein a blockchain tool 242 is installed. Memory 220-2 may also include a signature verification tool 244 and a public-key validation tool 246, configured to validate, authenticate, and verify access from different client devices 110 and servers 130 to blockchain database 152. Accordingly, server 130 may verify and apply a signature to a data block before storing in blockchain database 152. Hereinafter, processors 212-1 and 212-2 will be collectively referred to as "processors 212," and memories 220-1 and 220-2 will be collectively referred to as "memories 220." In some embodiments, memories 220 may include low latency memories, such as RAM (dynamic-RAM-DRAM-, or static RAM-SRAM-) that can be accessed quickly from an external device via a plugin socket in communications modules 218.

Data packets 227 may include time-sensitive information (e.g., time stamps and other metadata) and data value updates (e.g., stock market prices, weather conditions, sensor measurements, and the like). In some embodiments, data packets 227 may include encryption data and passwords, such as public keys and private keys. Moreover, in some embodiments, data packets 227 may include data signed by an authorized client or server in the blockchain network and already stored in memories 220. In some embodiments, data packets 227 may include a "blob" with multiple passwords, each password associated with a time-sensitive value. When a data packet or data update is accessed by a block producer in the blockchain network, it is saved as a signed/verified block 250 in blockchain database 152. In some embodiments, signed block 250 may include other action results from other external client devices 110, including various signatures and mechanisms to make it cryptographically secure. Signed block 250 may then be sent from server 130 to other block producers or client devices where it could be re-run (using the decrypted data) by a blockchain application.

Figure 3:
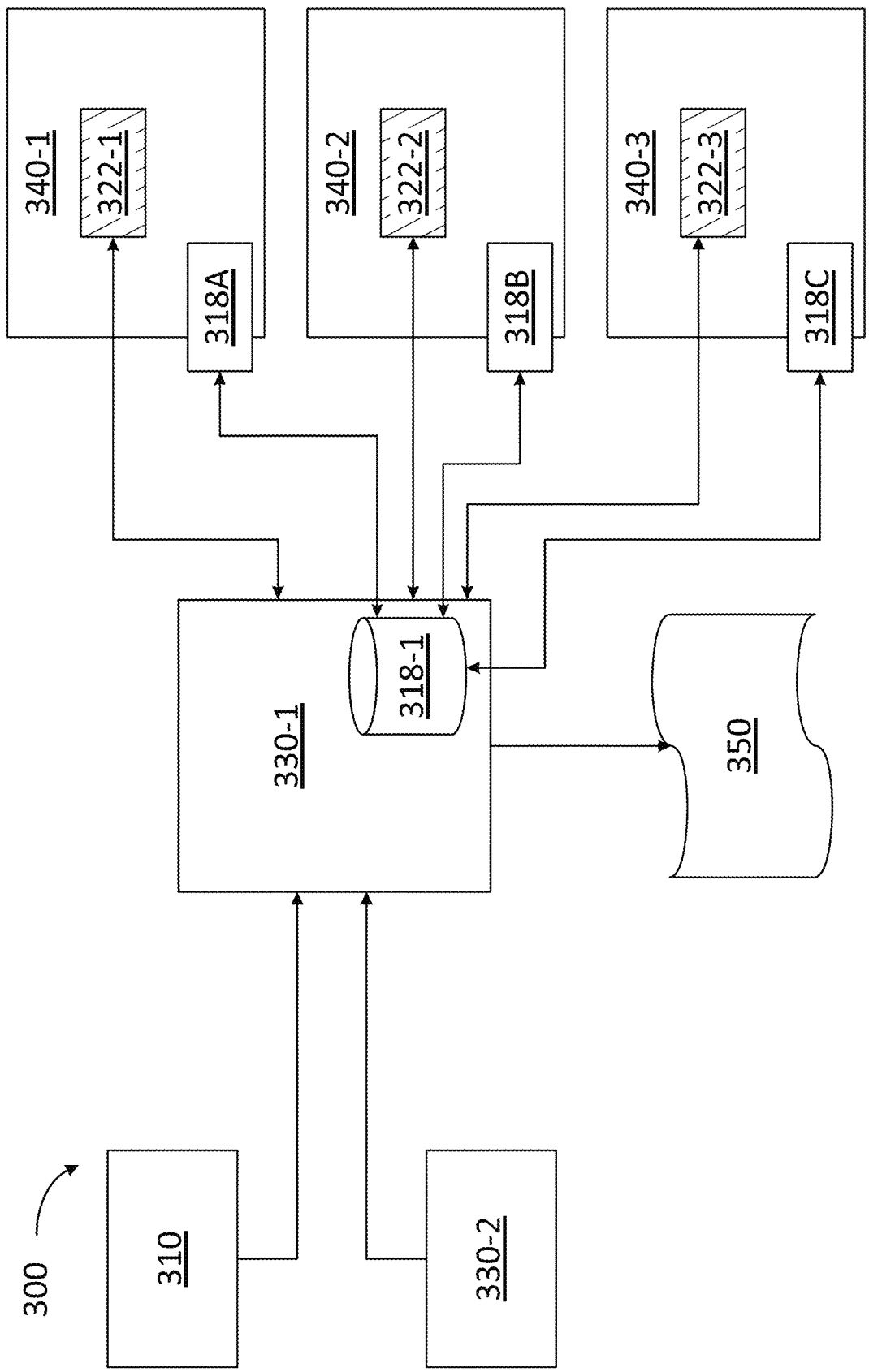
FIG. 3 illustrates a language agnostic blockchain network, according to some embodiments.

FIG. 3 illustrates a language agnostic blockchain network 300, according to some embodiments. A developer using a client device 310 sets code for a blockchain application hosted by a server 330-1. Server 330-1 may host a block producer that the developer is accessing to configure the blockchain application. A server 330-2 may be communicatively coupled with server 330-1, and configured to provide access to blockchain network 300 to any registered user, e.g., to access the blockchain application. The blockchain application may be any one of blockchain applications 322-1, 322-2, or 322-3 (hereinafter, collectively referred to as "blockchain applications 322"). In some embodiments, at least one of blockchain applications 322 may include a smart contract application, as disclosed herein. Each of blockchain applications 322 may be run on respective virtual machine (VM) containers 340-1, 340-2, and 340-3 (hereinafter, collectively referred to as "VM containers 340").

Each one of VMs 340 may include a specialized software development kit (SDK) 318A, 318B, and 318C (hereinafter, collectively referred to as "SDKs 318"), respectively. Accordingly, each of VM containers 340 and SDKs 318 may be configured in a different code language (e.g., Java, C++, Perl, and the like). SDKs 318 access and update a state variable 318-1 in server 330-1. Server 330-1 stores an encrypted block 350 in the blockchain database once a user of a service provided by server 330-2 executes blockchain application 322. Accordingly, the developer with client device 310 may select either one of VM containers 340 depending on a language of choice. The block producer in server 330-1 directs the actions and codes from client device 310 to the VM container that includes the desired language.

In some embodiments, block producer in server 330-1 may be configured to automatically identify a language used by the developer in client device 310, and re-direct the developer to the appropriate VM container 340. For example, in some embodiments, server 330-1 may identify a string of characters in a code script from client device 310 to automatically detect the language used by the developer. Some of the script that may be presented to server 330-1 may include character strings as follows:

"ile./abieos/build_/CMakeFiles/test_abieos_reflect.dir/ src/reflect_test.cpp.obj./abieos/build_/CMakeFiles/ test_abieos_reflect.dir/src/reflect_test.cpp.obj: Intel amd64 COFF object file, not stripped, 30 sections, symbol offset=0x33e6, 87 symbols iholsman @ Book:/ mnt/c/Users/ihols/src$ $ file./lib/JJIL-J2SE.ja./lib/ JJIL-J2SE.jar: Java archive data (JAR)"

Accordingly, server 330-1 may identify the sequence "lib/JJIL" or "JAR" as a JAVA script, and direct the developer to the appropriate VM container 340. In some embodiments, a type of executable file (e.g., the appropriate execution environment for a developer code) can usually be determined by the first few bytes in the file (e.g., with a character string such as "#!<executable path>"). For example, a sequence including "50 4B 03 04 14 00 08 00 08 00" may represent a Java JAR file (which would then be passed to a Java VM). A sequence including "43 23 2B 44 A4 43 4D A5 48 64 72" may indicate a C++ execution environment. A sequence including "7F 45 4C 46" may indicate a Linux executable environment.

Figure 4:
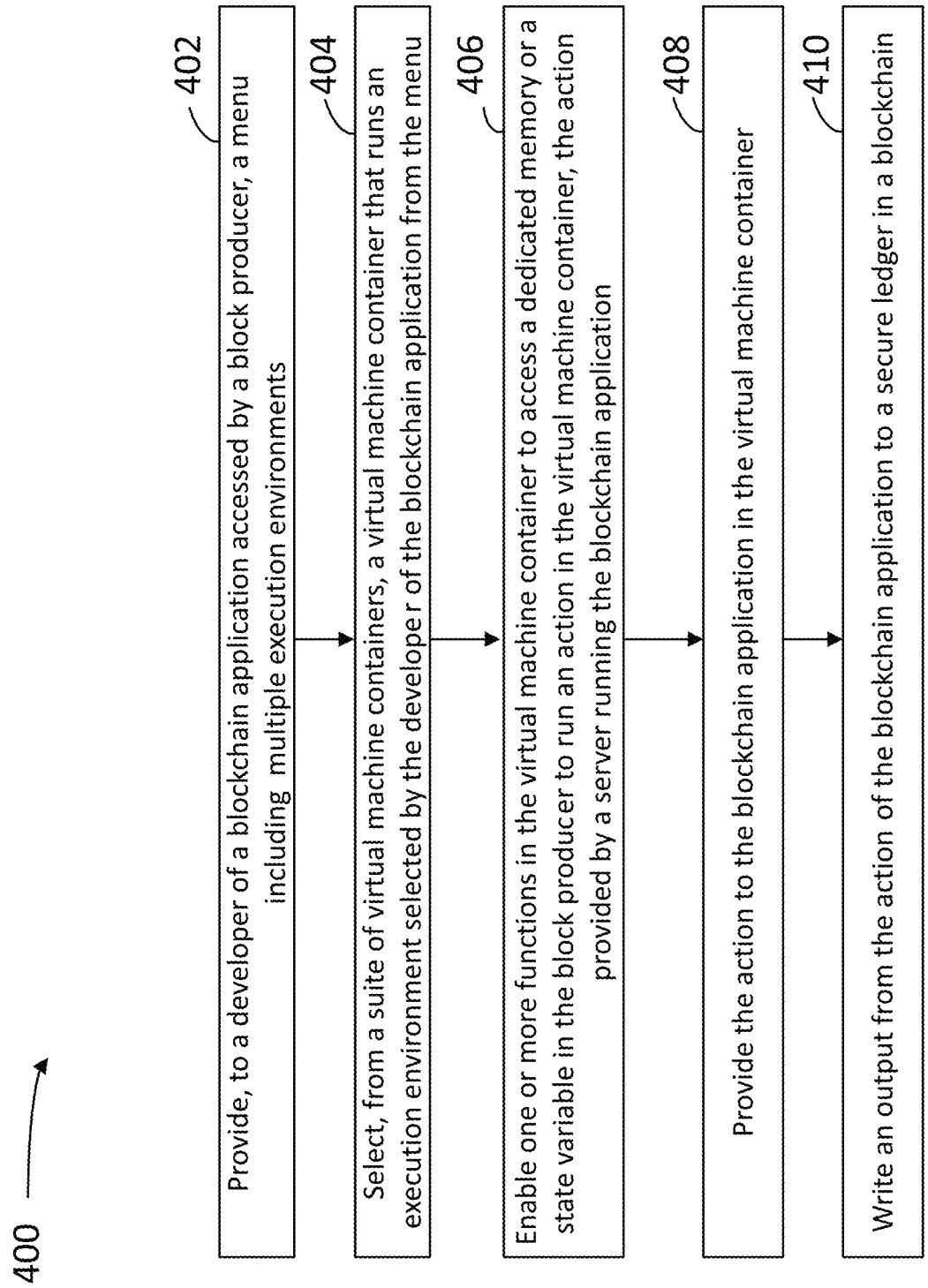
FIG. 4 is a flow chart illustrating steps in a method for providing a language agnostic smart contract execution on a blockchain, according to some embodiments.

FIG. 4 is a flow chart illustrating steps in a method 400 for providing a language agnostic smart contract execution on a blockchain, according to some embodiments. One or more of the steps in method 400 may be at least partially performed by a processor executing commands stored in a memory, the processor and memory being part of a client device, a server, or a blockchain database communicatively coupled with each other via a network (e.g., processors 212, memories 220, client devices 110, servers 130, network 150, and blockchain database 152). In some embodiments, the memory may include a virtual machine having a blockchain tool hosting a blockchain application in the client device, and the server may be a block producer coupled to a blockchain database, as disclosed herein (e.g., virtual machine 240, blockchain tool 242, and blockchain database 152). The memory may also include an encryption tool having a signature verification tool and a public-key validation tool to verify access to the blockchain tool and the blockchain database to other servers and clients (e.g., signature verification tool 244, public-key validation tool 246). In some embodiments, methods consistent with the present disclosure may include one or more steps from method 400 performed in a different order, at the same time, simultaneously, quasi-simultaneously, or overlapping in time.

Step 402 includes providing, to a developer of a blockchain application accessed by a block producer, a menu including multiple execution environments. In some embodiments, step 402 includes providing a menu with at least one of JVM, native, and C++ execution environments. In some embodiments, step 402 includes providing a menu including one or more versions of a same execution environment.

Step 404 includes selecting, from a suite of virtual machine containers, a virtual machine container that runs an execution environment selected by the developer of the blockchain application from the menu. In some embodiments, step 404 includes detecting the execution environment from a format of a header in a code script provided by the developer. In some embodiments, step 404 may include detecting in the code script from the developer, a sequence including the characters "50 4B 03 04 14 00 08 00 08 00" for a Java VM execution environment. Step 404 may include detecting a sequence including "43 23 2B 44 A4 43 4D A5 48 64 72" to identify a C++ execution environment. Step 404 may include detecting a sequence including "7F 45 4C 46," indicating a linux executable environment.

Step 406 includes enabling one or more functions in the virtual machine container to access a dedicated memory or a state variable in the block producer to run an action in the virtual machine container, the action provided by a server running the blockchain application. In some embodiments, step 406 includes executing a software development kit to access the state variable and a library accessible to the developer of the blockchain application.

Step 408 includes providing the action to the blockchain application in the virtual machine container. In some embodiments, step 408 includes preventing access to the blockchain application by a third party with a security feature in the virtual machine container.

Step 410 includes writing an output from the action of the blockchain application to a secure ledger in a blockchain.

Hardware Overview

Figure 5:
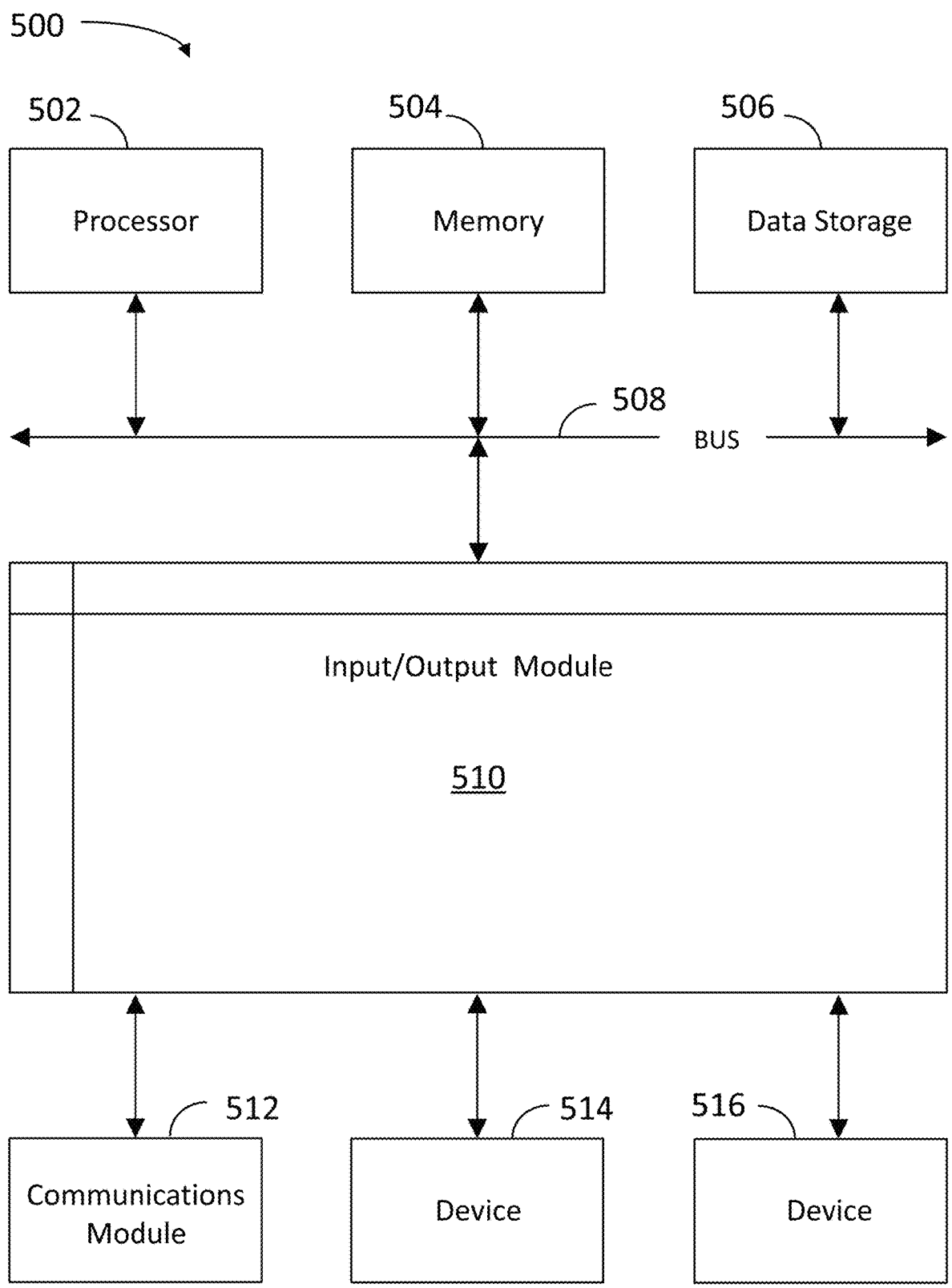
FIG. 5 is a block diagram illustrating an example computer system with which the client and server of FIGS. 1 and 2 and the method of FIG. 4 can be implemented.

FIG. 5 is a block diagram illustrating an example computer system 500 with which the client and server of FIGS. 1 and 2 and the method of FIG. 4 can be implemented. In certain aspects, the computer system 500 may be implemented using hardware or a combination of software and hardware, either in a dedicated server, or integrated into another entity, or distributed across multiple entities.

Computer system 500 (e.g., client device 110 and server 130) includes a bus 508 or other communication mechanism for communicating information, and a processor 502 (e.g., processors 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and intercoupled by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled with bus 508 for storing information and instructions. Computer system 500 may be coupled via input/output module 510 to various devices. Input/output module 510 can be any input/output module. Exemplary input/output modules 510 include data ports such as USB ports. The input/output module 510 is configured to connect to a communications module 512. Exemplary communications modules 512 (e.g., communications modules 218) include networking interface cards, such as Ethernet cards and modems. In certain aspects, input/output module 510 is configured to connect to a plurality of devices, such as an input device 514 (e.g., input device 214) and/or an output device 516 (e.g., output device 216). Exemplary input devices 514 include a keyboard and a pointing device, e.g., a mouse or a trackball, by which a consumer can provide input to the computer system 500. Other kinds of input devices 514 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 516 include display devices, such as an LCD (liquid crystal display) monitor, for displaying information to the consumer.

According to one aspect of the present disclosure, the client device 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be intercoupled by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires forming bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the clauses. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each clause. Rather, as the clauses reflect, inventive subject matter lies in less than all features of a single disclosed configuration or operation. The clauses are hereby incorporated into the detailed description, with each clause standing on its own as a separately described subject matter.

The clauses are not intended to be limited to the aspects described herein, but are to be accorded the full scope consistent with the language clauses and to encompass all legal equivalents. Notwithstanding, none of the clauses are intended to embrace subject matter that fails to satisfy the requirements of the applicable patent law, nor should they be interpreted in such a way.

What is claimed is:

1. A computer-implemented method for smart contract execution on a blockchain, comprising:
   providing, to a developer of a blockchain application accessed by a block producer, a menu comprising a list of multiple execution environments that includes at least different versions of a same execution environment, wherein the blockchain application is hosted by a server as an immutable register or a smart contract in a suite of virtual machine containers in the execution environments within the block producer in the server;
   selecting, from the suite of virtual machine containers, a virtual machine container that runs an execution environment selected by the developer of the blockchain application from the menu;
   enabling one or more functions in the virtual machine container to access a dedicated memory or a state variable in the block producer to run an action in the virtual machine container, the action provided by the server running the blockchain application for allowing the server to access the dedicated memory or the state variable from the one or more functions of the blockchain application executable in the virtual machine container provided by the server;
   providing the action to the blockchain application in the virtual machine container;
   preventing access to the blockchain application with a security feature in an associated virtual machine container; and
   writing an output from the action of the blockchain application to a secure ledger in a blockchain, wherein providing the menu comprising the list of multiple execution environments comprises providing the menu including at least one of Javascript Virtual Machine, native, and C++ execution environments.

2. The computer-implemented method of claim 1, wherein enabling one or more functions to access a dedicated memory space comprises executing a software development kit to access the state variable and a library accessible to the developer of the blockchain application.

3. The computer-implemented method of claim 1, further comprising preventing access to the blockchain application by a third party with a security feature in the virtual machine container.

4. The computer-implemented method of claim 1, wherein selecting a virtual machine that runs an execution environment selected by the developer comprises detecting the execution environment from a format of a header in a code script provided by the developer.

5. The computer-implemented method of claim 1, wherein selecting a virtual machine container that runs an execution environment selected by the developer of the blockchain application comprises selecting the virtual machine container that runs an updated version of the execution environment selected by the developer.

6. The computer-implemented method of claim 1, further comprising searching for a virtual machine container that runs an execution environment requested by the developer.

7. The computer-implemented method of claim 1, further comprising configuring a virtual machine container to run an execution environment requested by the developer.

8. The computer-implemented method of claim 1, further comprising allowing the server to access an updated value of the state variable from the blockchain application.

9. A system for smart contract execution on a blockchain, comprising:
   a memory configured to store instructions; and
   one or more hardware processors configured to execute the instructions to cause the system to:
   provide, to a developer of a blockchain application accessed by a block producer, a menu comprising a list of multiple execution environments that includes at least different versions of a same execution environment, wherein the blockchain application is hosted by a server as an immutable register or a smart contract in a suite of virtual machine containers in the execution environments within the block producer in the server;
   select, from the suite of virtual machine containers, a virtual machine container that runs an execution environment selected by the developer of the blockchain application from the menu;
   enable one or more functions in the virtual machine container to access a dedicated memory or a state variable in the block producer to run an action in the virtual machine container, the action provided by the server running the blockchain application to allow the server to access the dedicated memory or the state variable from the one or more functions of the blockchain application executable in the virtual machine container provided by the server;
   provide the action to the blockchain application in the virtual machine container;
   prevent access to the blockchain application with a security feature in an associated virtual machine container; and
   write an output from the action of the blockchain application to a secure ledger in a blockchain, wherein providing the menu comprising the list of multiple execution environments comprises providing the menu including at least one of Javascript Virtual Machine, native, and C++ execution environments.

10. The system of claim 9, wherein enabling one or more functions to access a dedicated memory space comprises executing a software development kit to access the state variable and a library accessible to the developer of the blockchain application.

11. The system of claim 9, further comprising preventing access to the blockchain application by a third party with a security feature in the virtual machine container.

12. The system of claim 9, wherein selecting a virtual machine that runs an execution environment selected by the developer comprises detecting the execution environment from a format of a header in a code script provided by the developer.

13. A non-transitory, computer-readable storage medium storing instructions which, when executed by a hardware processor, cause a computer to perform a method for smart contract execution on a blockchain, the method comprising:
   providing, to a developer of a blockchain application accessed by a block producer, a menu comprising a list of multiple execution environments that includes at least different versions of a same execution environment, wherein the blockchain application is hosted by a server as an immutable register or a smart contract in a suite of virtual machine containers in the execution environments within the block producer in the server;
   selecting, from the suite of virtual machine containers, a virtual machine container that runs an execution environment selected by the developer of the blockchain application from the menu;
   enabling one or more functions in the virtual machine container to access a dedicated memory or a state variable in the block producer to run an action in the virtual machine container, the action provided by the server running the blockchain application for allowing the server to access the dedicated memory or the state variable from the one or more functions of the blockchain application executable in the virtual machine container provided by the server;
   providing the action to the blockchain application in the virtual machine container;
   preventing access to the blockchain application with a security feature in an associated virtual machine container; and
   writing an output from the action of the blockchain application to a secure ledger in a blockchain, wherein:
   providing the menu comprising a list of the execution environments comprises providing the menu including at least one of a javascript virtual machine, native, and C++ execution environments, and
   providing the menu comprising a list of the execution environments comprises providing the menu including one or more versions of the same execution environment.

14. The non-transitory, computer-readable storage medium of claim 13 wherein, in the method, enabling one or more functions to access a dedicated memory space comprises executing a software development kit to access the state variable and a library accessible to the developer of the blockchain application.

15. The non-transitory, computer-readable storage medium of claim 13, wherein the method further comprises preventing access to the blockchain application by a third party with a security feature in the virtual machine container.

16. The non-transitory, computer-readable storage medium of claim 13 wherein, in the method, selecting a virtual machine that runs an execution environment selected by the developer comprises detecting the execution environment from a format of a header in a code script provided by the developer.

17. The non-transitory, computer-readable storage medium of claim 13, wherein the method further comprises at least one of searching for a virtual machine container that runs an execution environment requested by the developer of the blockchain application, or configuring a virtual machine container to run an execution environment requested by the developer of the blockchain application.

\* \* \* \* \*